US011372868B2

United States Patent
Reddekopp et al.

(10) Patent No.: US 11,372,868 B2
(45) Date of Patent: Jun. 28, 2022

(54) PARSING OF UNSTRUCTURED LOG DATA INTO STRUCTURED DATA AND CREATION OF SCHEMA

(71) Applicant: Oracle International Corporation, Redwood Shores, CA (US)

(72) Inventors: Rod Reddekopp, Surrey (CA); Andrew Brownsword, Bowen Island (CA); Manel Fernandez Gomez, Barcelona (ES); Juan Fernandez Peinador, Barcelona (ES)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 16/246,765

(22) Filed: Jan. 14, 2019

(65) Prior Publication Data
US 2020/0226214 A1 Jul. 16, 2020

(51) Int. Cl.
*G06F 16/2458* (2019.01)
*G06F 16/21* (2019.01)
(Continued)

(52) U.S. Cl.
CPC ...... *G06F 16/2458* (2019.01); *G06F 16/1734* (2019.01); *G06F 16/213* (2019.01);
(Continued)

(58) Field of Classification Search
CPC .. G06F 40/284; G06F 16/2458; G06F 16/213; G06F 16/1734; G06F 16/22;
(Continued)

(56) References Cited

U.S. PATENT DOCUMENTS 6,243,713 B1 * 6/2001 Nelson .................... G06F 16/40
707/999.104
7,599,952 B2 10/2009 Parkinson
(Continued)

FOREIGN PATENT DOCUMENTS

EP 2 945 113 A1 11/2015

OTHER PUBLICATIONS

Pradsad Bakshi Rohit et al., "Distributed Feature Selection Using Vertical Partitioning for High Dimensional Data", dated Sep. 21, 2016, IEEE, pp. 807-813.
(Continued)

*Primary Examiner* — Shahid A Alam
(74) *Attorney, Agent, or Firm* — Hickman Becker Bingham Ledesma LLP; Brian N. Miller

(57) ABSTRACT

Herein are techniques for training a parser by categorizing and generalizing messages and abstracting message templates for parsing after training. In an embodiment, a computer generates a message signature based on a message sequence of tokens that were extracted from a training message. The message signature is matched to a cluster signature that represents messages of one of many clusters that have distinct signatures. The training message is added to the cluster. Based on a data type of the cluster signature, a value is extracted from a second message, such as a live message after training. Fuzzy signatures may be probabilistically matched to select a best matching cluster for a message. The value range of a token may be broadened or narrowed by adding or removing candidate data types, by adding or removing literals to a data type, and/or by promoting a narrow data type to a broader data type.

25 Claims, 8 Drawing Sheets

(51) Int. Cl.
  *G06F 16/17*    (2019.01)
  *G06N 3/04*    (2006.01)
  *G06N 3/08*    (2006.01)
  *G06F 40/284*    (2020.01)
  *G06N 20/20*    (2019.01)

(52) U.S. Cl.
  CPC ......... *G06F 40/284* (2020.01); *G06N 3/0445* (2013.01); *G06N 3/08* (2013.01); *G06N 20/20* (2019.01)

(58) Field of Classification Search
  CPC ..... G06F 16/40; G06F 16/322; G06N 3/0445; G06N 3/08; G06N 20/20
  USPC ......................................................... 707/755
  See application file for complete search history.

(56) References Cited

U.S. PATENT DOCUMENTS

| | | | | |
|---|---|---|---|---|
| 8,447,989 | B2* | 5/2013 | Barrus | H04L 9/3242 713/181 |
| 8,495,429 | B2 | 7/2013 | Fu et al. | |
| 9,020,871 | B2 | 4/2015 | Lane et al. | |
| 9,218,390 | B2 | 12/2015 | Feng et al. | |
| 9,299,041 | B2 | 3/2016 | Tsumura et al. | |
| 9,600,542 | B2* | 3/2017 | Mueller | G06F 16/22 |
| 9,646,262 | B2 | 5/2017 | Philipps et al. | |
| 2010/0088522 | A1* | 4/2010 | Barrus | H04L 9/3242 713/181 |
| 2013/0097125 | A1 | 4/2013 | Marvasti et al. | |
| 2013/0151561 | A1* | 6/2013 | Pfeifle | G06F 16/322 707/769 |
| 2013/0166580 | A1* | 6/2013 | Maharajh | G06F 16/40 707/758 |
| 2014/0279747 | A1 | 9/2014 | Strassner | |
| 2015/0094959 | A1 | 4/2015 | Ning et al. | |
| 2016/0092552 | A1* | 3/2016 | Morfonios | G06F 16/1734 707/737 |
| 2016/0292166 | A1 | 10/2016 | Russell | |
| 2016/0292263 | A1 | 10/2016 | Ferrar | |
| 2016/0292592 | A1 | 10/2016 | Patthak et al. | |
| 2017/0083827 | A1 | 3/2017 | Robatmili et al. | |
| 2017/0161637 | A1 | 6/2017 | Misra et al. | |
| 2017/0366353 | A1* | 12/2017 | Struttmann | H04L 9/0618 |
| 2019/0370347 | A1* | 12/2019 | Levy | G06F 16/355 |
| 2020/0045049 | A1 | 2/2020 | Apostolopoulos et al. | |
| 2020/0364585 | A1 | 11/2020 | Chandrashekar | |

OTHER PUBLICATIONS

Moran-Fernandez L et al., "Centralized Vs. Distributed Feature Selection Methods Based on Data Complexity Measures", Knowledge-Based Systems, vol. 117 dated Sep. 28, 2016, pp. 27-45.

Bolon-Canedo V et al., "Distributed Feature Selection: An Application to Microarray Data Classification", Applied Soft Computing, vol. 30, dated Feb. 7, 2015, pp. 136-150.

Suh-Lee, Candance, "Mining Unstructured Log Messages for Security Threat Detection", UNLV Theses, Dissertations, Professional Papers, and Capstones, dated May 1, 2016, 67 pages.

Srinivasa et al., "Text Analytics to Data Warehousing", (IJCSE) International Journal on Computer Science and Engineering, vol. 02, No. 06, dated 2010, 7 pages.

Spunk, "Splunk® Enterprise Distributed Deployment Manual 7.2.1" https://docs.splunk.com/Documentation/Splunk/7.2.1/Deploy/Datapipeline, dated 2018, 48 pages.

Splunk, "Splunk® Enterprise Forwarding Data 7.2.1", https://docs.splunk.com/Documentation/Splunk/7.2.1/Forwarding/Typesofforwarders, dated 2018, 79 pages.

Splunk, "Getting Data In", http://dev.splunk.com/view/dev-guide/SP-CAAAE3A, dated 2018, 17 pages.

Splunk, "Building in telemetry with high-performance data collection", http://dev.splunk.com/view/dev-guide/SP-CAAAE7B, dated 2018, 19 pages.

Niraula, Neeta, "Web Log Data Analysis: Converting Unstructured Web Log Data into Structured Data Using Apache Pig", St. Cloud State University, dated May 2017, 54 pages.

Xu, Wei, "System Problem Detection by Mining Console Logs", Technical Report No. UCB/EECS-2010-112, dated Aug. 1, 2010, 110 pages.

Sarkar, Dipanjan, "Continous Numeric Data, Towards Data Science", dated Jan. 4, 2018, 28 pages.

Jubatus, "Data Conversion" http://jubat.us/en/fv_convert.html, last viewed on May 20, 2019, 27 pages.

Data Science, "How does one go about feature extraction for training labelled tweets for sentiment analysis?", https://datascience.stackexchange.com/questions/30516, last viewed on May 20, 2019, 10 pgs.

Buitinck et al., "API design for machine learning software: experiences from the scikit-learn project", dated Sep. 2013, 15 pages.

* cited by examiner

PARSING OF UNSTRUCTURED LOG DATA INTO STRUCTURED DATA AND CREATION OF SCHEMA

FIELD OF THE INVENTION

The present invention relates to log parsing. Herein are techniques for training a parser by categorizing and generalizing log messages and abstracting message templates for use by the parser after training.

BACKGROUND

Log messages contain a wealth of information about what is happening within a network or datacenter, and analysts spend a large amount of time working with logs. A problem is that the format of log messages varies wildly from one appliance to another, which limits reusability of log analysis tooling. Industry has tried to solve this problem by creating log-source-specific plug-ins so that an analysis system can extract meaningful information.

There is a significant cost to a vendor for creating and maintaining log-source-specific plug-ins, and if a customer needs to parse an unfamiliar log source, a new plug-in must be written and maintained either by the customer or the vendor. A solution is needed that can work without source-specific plug-ins, so meaningful information can be extracted from any log source.

A solution is needed that could parse arbitrary new or versioned log sources without any additional development effort/cost. A solution is needed that could be applied in any application that needs to extract data from unstructured logs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
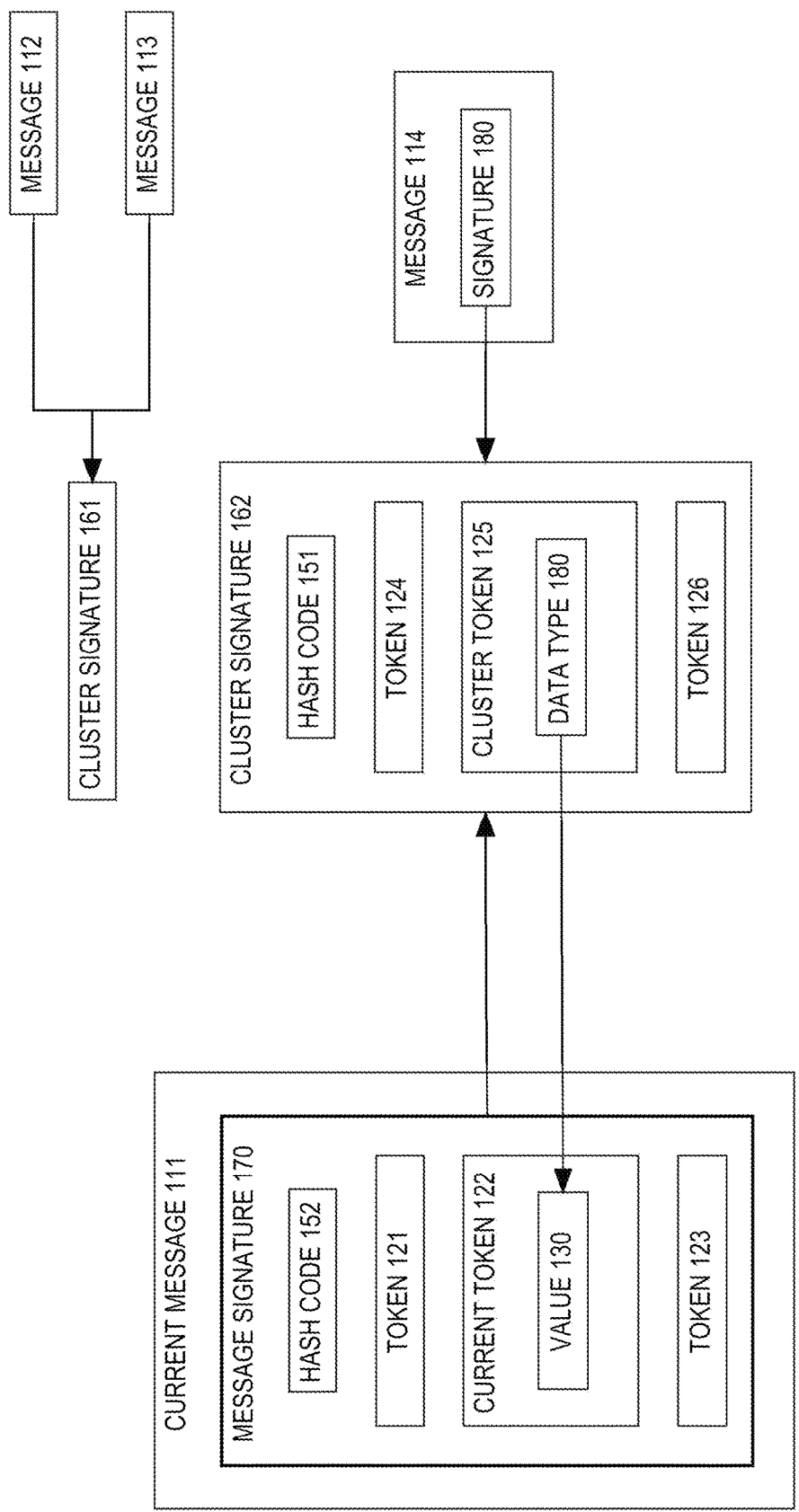
FIG. 1 is a block diagram that depicts an example computer that trains a parser by categorizing and generalizing a corpus of log messages.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are computerized techniques for training a parser by categorizing and generalizing messages and abstracting message templates for use by the parser after training. In an embodiment, a computer generates a message signature based on a message sequence of tokens that were extracted from a training message. The message signature is matched to a cluster signature that represents messages of one of many clusters that have distinct signatures. The training message is added to the cluster. Based on a data type of the cluster signature, a data value is extracted from content of a second message, such as a live message in production after training. Completely correct and stable parsing results need not be guaranteed, which may be more or less tolerated by downstream machine learning that may consume parsing results.

In an embodiment, a computer trains by calculating a message hash code based on a message sequence of tokens that were extracted from a training message. The training message is added to a cluster of messages that have the same message hash code. Based on the cluster of messages, a cluster signature is generated that describes said cluster of messages. After training, such as in production with live messages, a second sequence of tokens is extracted from a second message. The same message hash code is calculated based on said second sequence of tokens. Based on the message hash code, the cluster signature is selected. Based on a data type of a token of the cluster signature, the second message is parsed.

In an embodiment, some tokens are fuzzy and may each have multiple candidate data types with respective probabilities. Based on those probabilities, fuzzy signatures may be probabilistically matched to select a best matching cluster for a message. In an embodiment, the value range of a token may be broadened or narrowed by adding or removing candidate data types, by adding or removing literals to a data type, and/or by promoting a narrow data type to a broader data type.

In an embodiment, a training corpus of training messages is partitioned for horizontal scaling such as with multicore or other symmetric multiprocessing (SMP). In an embodiment, hashing of field names and hashing of signatures of messages and clusters accelerates matching. In an embodiment, a cluster signature operates as a message template for accelerated message parsing.

After training and in production, downstream consumers may receive named and/or typed data from the parser. Parser output may be denser than unparsed messages because extracted data may have a denser multi-bit representation and also because uninteresting (e.g. invariant) portions of messages may be discarded. Thus, (e.g. feature encoding such as dense or sparse bit vector) output of the parser may be ideally suited for consumption by downstream machine learning (ML) techniques such as autoencoding, feature embedding, and artificial neural networks (ANN).

The lean nature of the operation and output of the parser in production may suit infrastructure applications such as health monitoring and security surveillance of a data center or computer cloud. For example, network elements such as switches and computers and their applications and subsystems such as logs and sensors may publish telemetry for central recordation.

Text or binary telemetry may be parsed as discussed herein. Downstream of the parser may be ML for detection, prediction, and/or alerting of performance, utilization, or intrusions. For example, a recursive neural network (RNN) may treat a log as time series data for sequence analysis, thereby learning temporal patterns and, by comparison, recognition of trends or anomalies.

The state of the art for log parsing entails substantial human effort. For example, best of breed log mining tool, Splunk, recommends manual configuration of log content generation, manual declaration of hints for parsing lines and fields of logs, and manual parser selection, such as when to use a key-value parser. For parsing custom (e.g. application specific) field types, Splunk requires "modular input" that entails manual development of custom logic in Python, JavaScript, or Java, which are expensive skills.

The parser training and inferencing techniques herein may achieve a computer that can automatically learn to recognize which message types have which fields and which fields have which data types. The parsers herein discover, in a novel way, the type, structure, and range of available log messages. The discovery techniques herein are not based on a priori knowledge of log content and format, although conventional parser design by a subject matter expert typically relies on a priori knowledge of message schema. Parser training herein is a fundamentally different technique from the way a human expert crafts a custom parser, and is fundamentally different from known extension methods of available log parsing frameworks such as Splunk.

The flexibility achieved herein achieves novel training with log messages that have not benefited from human examination and analysis. The parsers herein may be readily and automatically retrained when log traffic evolves, and without human expertise. Retraining herein is data driven and probabilistic, which is not how a human expert may adapt an existing parser, such as by maintaining logic. The parsing computers herein not only automate what was not previously automated, but also achieve flexible parsing in a fundamentally different way.

Thus, techniques herein fundamentally improve the performance of a parsing computer by endowing the computer with training and retraining capabilities not contemplated in the art. Herein, training and retraining entails unconventional processing to add functionality and flexibility not contemplated in the art. Ultimately, herein are parser computers that more or less train and retrain themselves, which is unconventional.

Because state of the art log mining tools such as Splunk do not automatically parse custom data types, conventional parser output tends to incompletely parse, such that substring patterns such as literal alternation and bounded value ranges and thus not include all latent semantic data and/or not achieve the output encoding density of the parsers herein. Denser and more relevant parser output may improve the accuracy and performance of the parser itself and of downstream consumers of parser output. Techniques herein reduce consumption of time and space within the lean parsers herein, and the denser and more relevant parser output confers those time and space savings upon applications that embed the parser or are otherwise connected to the parser output. Thus, these highly efficient techniques for parsing types of messages and message fields directly improve the performance of parsing computers and parser output consuming computers.

1.0 Example Computer

FIG. 1 is a block diagram that depicts an example computer 100, in an embodiment. Computer 100 trains a parser by categorizing and generalizing a corpus of log messages. Computer 100 may be one or more of a rack server such as a blade, a personal computer, a mainframe, a virtual machine, or other computing device.

Computer 100 hosts a log parser in training. Training entails exposing the parser to a corpus of sample log messages such as 111-114. Each message may be text string, such as one or more lines of text, such as emitted by software processes during operation. For example, the corpus of messages may be an interleaving or other aggregation of console log files or other diagnostic output.

For example, log messages may be recorded from console output such as standard out (stdout), standard error (stderr), or other output stream. A message log may be directly generated by a software application or delegated by the application to a structured logging framework such as system logger (syslog) or audit demon (auditd) for Linux.

Some messages may be wholly or partially identical. In one example, a message may be generated by decorating (i.e. concatenating) reusable immutable text with a live timestamp. In another example, a message may be generated from an original template having placeholders (i.e. formal parameters) into which arguments (i.e. actual values) may be substituted (i.e. embedded). For example, a standard C library may contain a formatted print (printf) function that combines a static template with dynamic values. For example, "%time Size=%integer" may be a format string (i.e. original template) that may generate similar messages such as "12:55 PM Size=23".

Theoretically an original template could be used to parse messages that were generated with that template. For example, C's printf may use a format string to generate a message, and later C's scanf function may use the same format string to parse the message. For example, a parse may extract a time from each timestamped message. The time value may be extracted as unformatted text. In an embodiment, the parser also converts the unformatted text of the time value into a strongly typed (e.g. structured) value that may be densely encoded, such as a bit string, such as a long (e.g. pair of machine words) integer.

However, original templates may be unavailable, such as more or less hidden within an opaque codebase, such as an executable binary. Thus in practice, an untrained parser may have a corpus of messages, but none of the original template (s) from which those messages were generated. Training techniques herein can infer (i.e. synthesize) template(s) through a process of reverse engineering based on categorization and generalization of sample (i.e. training) messages.

Herein, an inferred template is shown as a cluster signature, such as 161-162. A cluster signature may serve two purposes. First during training, a cluster signature operates as a category of more or less similar messages. The cluster signature is more than merely a category. The cluster signature and its internal components provide a mechanism by which similar messages may be generalized (i.e. abstracted). Second after training, a cluster signature may operate as a message parsing template for high speed, low memory, high accuracy, semantic extraction of message data. Semantic extraction may entail isolation of values, imposition of data types, and recognition of field names. For example, a cluster signature may achieve an optimal time/space performance of a compiled regular expression by forgoing grammar-based scanning and syntax-based parsing needed by other semantic techniques. Indeed, compiled regular expressions may be an implementation mechanism for tokenization techniques described herein.

A cluster signature contains a sequence of cluster tokens. For example, cluster signature 162 has tokens 124-126. Although not shown, cluster signature 161 also contains tokens.

A token is a fragment of a message. For example, the text of message 111 may be logically split into tokens 121-123. Every message has at least one token, which as an extreme case, includes the whole text of the message. Tokens serve two major purposes. First, a token may isolate an interesting value, such as a timestamp. Second, a token may be a discriminator. For example, each of two messages may have a respective sequence of tokens. If those sequences are distinct, then the messages might be too dissimilar to aggregate into a same category. For example, a token from each sequence may be compared, such that dissimilar tokens may indicate dissimilar sequences. Token comparison is discussed later herein.

There are two major kinds of tokens. A message token is part of an actual message. For example, message 111 contains message tokens 121-123 that have actual substrings of the text of message 111. A cluster token is part of a cluster signature. For example, cluster signature 162 contains cluster tokens 124-126. Usually token comparison involves one message token and one cluster token.

A token may have a text literal (i.e. immutable string). Such tokens are similar during comparison only when their text more or less directly matches, perhaps ignoring alphabetic case sensitivity and/or whitespace.

A token may instead be a generalization, such as a pattern, that may match a variety of conforming literals. For example, token 125 may be strongly typed, such as according to data type 180. For example data type 180 may be a signed integer. Thus, message token 122 may match cluster token 125 because the text of token 122 is "−1" that can actually parse into value 130 as a signed integer. Likewise, message token 121 may have text of "0" that is lexically dissimilar to "−1" and yet semantically similar because both strings are interpretable as signed integers.

In an embodiment, token matching is a binary (i.e. yes/no) decision. In another embodiment, token matching is fuzzy (i.e. probabilistic), with an attempted match resulting in a calculated probability of a match, such as a real number between zero (i.e. clearly no match) and one (i.e. clearly matched). The significance of probabilistic matching is discussed later herein.

In an embodiment, each cluster token can calculate a match probability for any message token. In an embodiment, cluster tokens of a same kind delegate probability calculation to a same match detector, and cluster tokens of different kinds delegate probability calculation to different match detectors. Detectors are discussed later herein.

Training of computer 100 entails various major activities: message tokenization, message clustering, hashing, token matching, and token generalization. Additional training activities such as cluster splitting/merging and token splitting/merging are discussed later herein.

Message tokenization splits the text of a message into a sequence of tokens. For example, message 111 is split into tokens 121-123. For example, tokens 121-123 may correspond to individual natural words in the text of a message that are naturally separated by whitespace. Tokenization may be based on delimiters and/or patterns.

In an embodiment, a delimiter separates two tokens, and after the two tokens are extracted, then the delimiter may be discarded. For example, whitespace and/or commas may or may not be delimiters. For example, a period as a sentence terminator may be a delimiter, but a period within a real (e.g. floating point) number may not be a delimiter. Thus, a delimiter may be somewhat contextual and somewhat pattern based, such as a period followed by one or two spaces followed by a capital letter of a next sentence.

A pattern to extract a token may be a regular expression, a data type, or other text generalization. A pattern may be more or less complex. For example, a name-value pair pattern may be a word (i.e. name) followed by an equals sign followed by a value, such as "size=32", which can be extracted as a single message token have a field value of 32 and a field name of "size". Field names are discussed later herein.

Extraction is a logical action that may be achieved in various ways. In one embodiment, extraction entails copying an extracted substring. In another embodiment, extraction entails leaving the substring in place and demarking it with decorations such as: a) beginning and ending character offsets, b) beginning offset and length, or c) length only (with beginning offset implied as a sum of lengths of preceding tokens). In those ways, a token may operate according to various structural design patterns such as decorator and/or flyweight.

With message tokenization techniques such as those, a message may be quickly split into tokens or, in a degenerate case, left whole as a single monolithic token, such as when a message has no clear delimiters and contains no matches of predefined patterns, such as a signed integer. Tokenization may be context free for high speed and low memory. For example, a number may be extracted wherever it occurs and regardless of neighboring tokens (i.e. context). Thus to some extent, initial tokenization of a message may occur in a vacuum, without regard for other portions of the message and/or without regard for known cluster signatures. Cluster signatures are explained as follows.

Parser training may entail clustering of somewhat similar messages, such as messages that may have been generated by a same original format string. Thus, clustering is an inferencing technique that can infer a common origin of similar messages. Clustering may or may not aggregate somewhat similar messages of different, even totally unrelated, origins. A cluster is also referred to herein as a category.

Initially, the parser is wholly untrained. In this initial state (not shown), the parser has an unprocessed (i.e. unclustered) corpus of messages 111-114 and no clusters. The parser trains by processing each message, serially or in parallel as discussed later herein. In this example, message 114 is the first to be processed. A context free tokenizer splits message 114 into tokens, such as shown with message 111. The tokens of message 114 form message signature 180.

Processing each message entails assigning the message to a cluster. Because initially there are no clusters, message 114 becomes its own cluster. Initial signature 180 of message 114 is copied as initial cluster signature 162 of the first cluster. A signature of a cluster and/or message may evolve as explained later herein.

Eventually message 111 is processed as a current message during training, which includes tokenization to create message signature 170. Processing of message 111 continues by assigning message 111 to a cluster, which entails finding a cluster whose cluster signature more or less matches message signature 170. Matching of signatures 162 and 170 may entail matching the signatures' sequences of tokens, such as by matching one token at a time from each sequence.

For example tokens 121 and 124 may be literals that have exactly matching characters (i.e. identical text). Whereas, token 125 has data type 180, which is not a literal. Tokens 122 and 125 match only if value 130 conforms to data type 180. For example if data type 180 is a color data type, and value 130 is "blew", then value 130 cannot be parsed as data type 180, in which case tokens 122 and 125 might not match.

In an embodiment, signature matching is a binary (i.e. yes/no) decision. In another embodiment, signature matching is fuzzy (i.e. probabilistic), with an attempted match resulting in a calculated probability of a match. For example, a signature match probability may be an integration or statistic of token match probabilities of tokens in the signature. For example, the signature match probability may be a mean, a minimum, a maximum, a median, or a mode of token match probabilities. A mean may be arithmetic, which is efficient to calculate, or a geometric or harmonic mean for greater accuracy. The signature match probability may exceed one, which is counter-intuitive. For example, the signature match probability may be a summation of token match probabilities. The significance of probabilistic signatures is discussed later herein.

In an embodiment, signature matching is accelerated by hashing. For example, a signature of a message or cluster has a sequence of tokens from which a hash code may be calculated, such as 151-152. For example, a hash code may be based on a count and/or ordering of tokens and/or an integration of hash codes of individual tokens. For example, each token may have a hash code based on attributes of the token such as type, field name, and/or position within the sequence of tokens of the signature. Thus, a pair of non-matching signatures can be detected in constant time and almost instantaneously, because their hash codes are different. Indeed, a hash table that maps unique hash codes to respective clusters can select a matching cluster for a message in constant time. Hash collisions between two clusters is discussed later herein.

If message signature 170 matches cluster signature 162, then current message 111 may join the cluster having signature 162. Thus, messages 111 and 114 would be in a same cluster. In an embodiment, current message 111 joins whichever cluster has the highest signature match probability.

If message signature 170 matches no cluster, or if the highest signature match probability does not exceed a threshold, then a new cluster is created for message 111 in more or less the same way as creating a first cluster for a first message. Thus during training, clusters organically grow by monotonically increase in number (i.e. as dissimilar messages are processed) and individual size (i.e. as similar message as processed). Training finishes after all messages of the training corpus are processed.

The parser may transition from training to inferencing, such as when deployed into production on computer 100 or another computer. An inferencing parser is leaner than a training parser as follows. The training corpus of messages is replaced with a production corpus, such as an hourly batch of recent messages or a (e.g. infinite) more or less continuous stream of live messages, which may or may not be a confluence of lesser streams from various network elements. Thus, an inferencing parser need not actually retain a corpus of messages.

In any case, the inferencing clusters need not retain affiliated messages. Thus a minimally lean inferencing parser has only cluster signatures as static data and a single current message as work in progress, which amounts to a tiny memory footprint. That is ideal for embedding such as into a resource constrained network element. In an embodiment, message text may occur within binary data, and a message is a communication message such as an application message, a network message, a protocol data unit (PDU), or a transmission packet. For example, an ethernet switch may host the parser to achieve semantic analysis such as packet sniffing or deep packet inspection.

Over time (e.g. weeks), log traffic may evolve, such that cluster signatures become less accurate, such as after an application upgrade that includes new or adjusted original format strings, or when an application is decommissioned. Tolerating (i.e. future proofing) unexpected (e.g. unmatchable) messages in production is discussed later herein. Retraining may adapt the parser for strange traffic. For example, a parser may be retrained from scratch as a nightly or weekly batch job using a new or adjusted corpus that includes a (e.g. random) sampling of recent messages and/or strange messages that the parser recently flagged as more or less unmatchable.

2.0 Example Parsing Process

Figure 2:
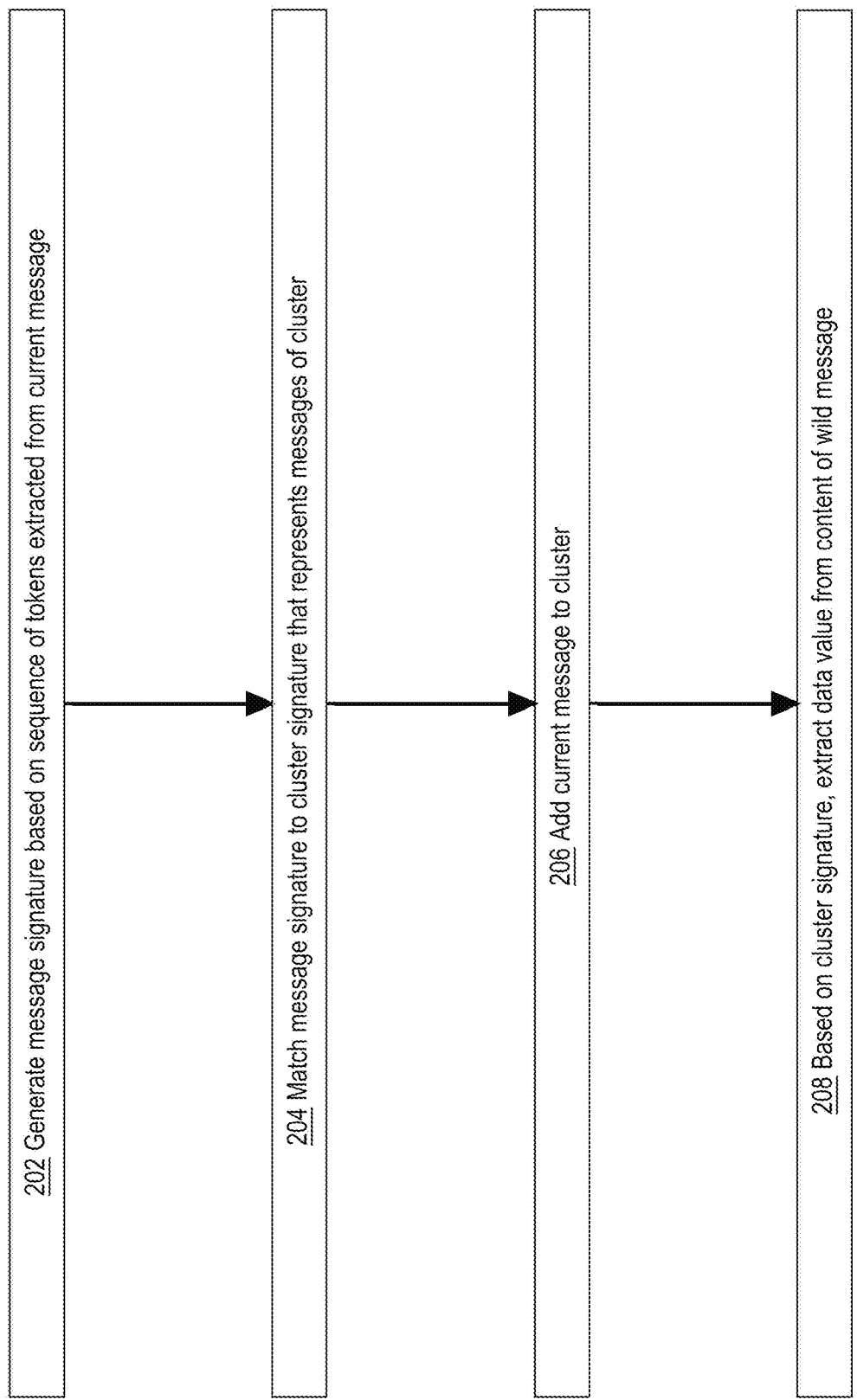
FIG. 2 is a flow diagram that depicts an example computer process for training and inferencing.

FIG. 2 is a flow diagram that depicts computer 100 training and inferencing, in an embodiment. FIG. 2 is discussed with reference to FIG. 1.

Steps 202, 204, and 206 occur during training and may be repeated for each message in a training corpus. In a sequential embodiment, a uniprocessor processes each message of the corpus in sequence. In a multiprocessing (e.g. multicore) embodiment, each processor may process one message at a time from a respective subset (i.e. partition) of the corpus. In another multiprocessing embodiment, processors race to take work from a shared corpus.

Step 202 generates a message signature based on a sequence of tokens that are extracted from a current message. For example, each core of a multicore CPU may process a respective current message. Tokenization may be based on splitting the text of a message according to delimiters such as whitespace and/or some special punctuation. For example, current message 111 may be split into tokens 121-123 as explained above. Tokens 121-123 may contain raw/untyped substrings of the text of current message 111 and/or parsed values of several possible data types as discussed later herein with fuzzy tokens. Message signature 170 is generated based on the sequence of tokens 121-123.

Scanning may be needed to find and extract field names, such as for name-value pairs. In an embodiment, tokenization may depend on an initial characterization of a message as conforming to an encoding dialect such as JavaScript object notation (JSON) or extensible markup language (XML). For example, the trainable parser of computer 100 may include several alternate parsers to which token demarcation and raw value extraction may be delegated for a respective dialect. For example, the trainable parser may have a JSON parser and an XML parser that split messages into substrings based on the dialect. Dialect based splitting may include extraction of field values, field names, and/or name-value pairs.

Dialect based splitting may also include delimiter detection, such as detection of separators such as whitespace and pipe characters and detection of grouping punctuation such as left and right characters such as parentheses, curly braces, and square and angle brackets. This may include balancing of left and right grouping punctuation and/or level detection of nested groups. In an embodiment, messages may be nested within messages, thereby necessitating context free message boundaries, such as with a push down parser.

For example, log generation may pass through multiple software layers or tools that decorate, embed, or otherwise augment an original message with additional material. In an embodiment, different dialect parsers are needed for a same message, such as when a JSON or XML portion is embedded within a plain text message. A dialect parser may also translate escaped characters and/or between character sets and/or character encodings, such as ASCII encoding of UNICODE.

Step 204 matches the message signature to a cluster signature that represents messages of a cluster. For example, message 114 was processed before current message 111 and already belongs to a cluster that has cluster signature 162. Cluster signatures 161-162 may have variable tokens that each has a respective value range (e.g. enumerated literals or numeric range) according to a respective data type. For example, token 125 has data type 180 that may have a set of text values of a same type or category, such as colors. Instead, data type 180 may be a numeric type.

Instead of a variable token, cluster signature 162 may contain a literal token, such as when a substring of similar messages is an invariant. For example, all message instances that were generated by a same original format string may contain a same string literal at a same position in the messages.

Signature matching may be inexact. For example, a token in a cluster signature may initially expect an exact literal, and later the token may be relaxed to become a variable token that may have a range of values as discussed later herein. In any case, step 204 selects a cluster based on a best signature match. For example, message signature 170 may best match with cluster signature 162. Detecting a best match is discussed later herein. If no match occurs, then a new cluster is created, and the current message signature becomes the initial signature of the new cluster.

Step 206 adds the current message, such as 111, to the selected cluster. If a cluster signature 162 of the selected cluster contains a token, such as 126, whose type detector cannot parse the value of a corresponding token, such as 123, in the message being added, then the cluster signature token will be promoted to a more general type, possibly all the way to the generic (i.e. wildcard) type. Token type generalization is discussed later herein.

A cluster may accumulate multiple training messages. For example, the cluster with cluster signature 161 contains messages 112-113. Addition of current message 111 to the cluster may entail token type generalization, which may reduce the cluster match score of messages 112-113 that are already in the cluster. If such a score of a message such as 112 falls below the cluster matching threshold, then message 112 may be removed from that cluster to create a new cluster.

Unlike steps 202, 204, and 206, step 208 entails inferencing and may occur in production after training. For example, a message parser already in production may be reloaded with trained cluster signatures 161-162. The reloaded parser may process live messages from the wild. For each live message, the parser may tokenize the message, calculate a message signature, match the message signature to a best matching cluster signature, and use the cluster signature to extract typed data from the already tokenized live message.

3.0 Example Parser in Training

Figure 3:
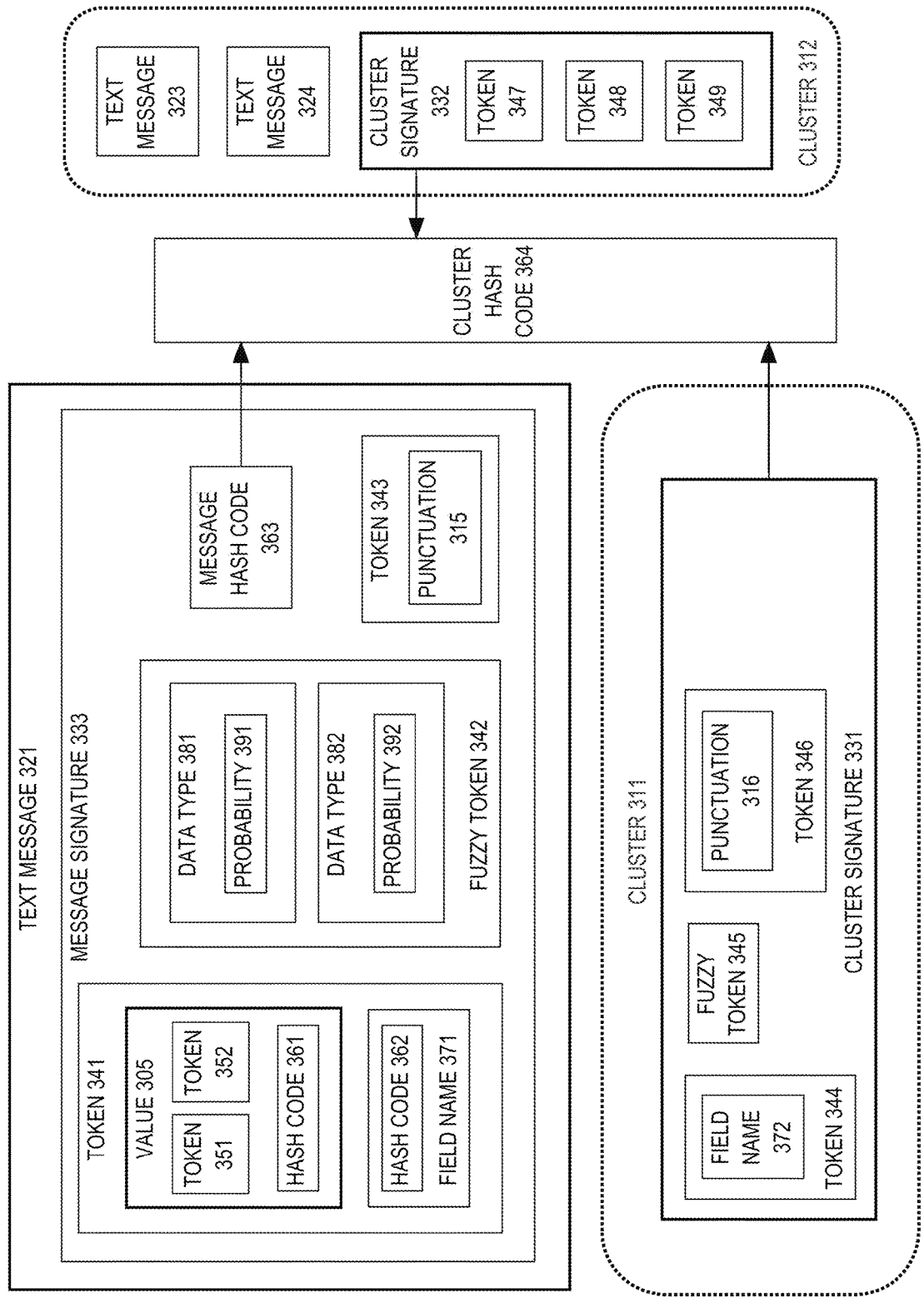
FIG. 3 is a block diagram that depicts an example message parser in training.

FIG. 3 is a block diagram that depicts an example message parser 300 in training, in an embodiment. Parser 300 is probabilistic and can adjust clusters and tokens such as by merging, splitting, and/or generalizing. Parser 300 may be an implementation of the parser of computer 100.

As explained above, a message is split into substrings, and each substring is wrapped by a respective token. Also as explained, tokenization may entail submitting a same substring to multiple detectors for probabilities calculation. Each detector may correspond to a respective data type, such as 381-382, and each detector may return a match probability for the respective type, such as 391-392.

Thus, a single substring may become associated with multiple data types 381-382 and multiple respective probabilities 391-392, all of which may be encapsulated in a single fuzzy token such as 342. In an embodiment, data types with zero probability or a probability beneath a threshold are excluded from fuzzy token 342. In an embodiment, only a threshold count of data types with highest probabilities are included in fuzzy token 342, such as the two best matching data types.

Fuzziness (i.e. ambiguity) may occur naturally. For example, a string "May" may be parsed as strongly typed enumeration literal such as a month, or unparsed as untyped (i.e. raw) text. Likewise, a string "5" may be parsed as the ordinal month of May, as an unsigned integer, or as a signed integer. In an embodiment, a detector is (e.g. manually) designed to detect predefined literals or patterns. For example weekday names, perhaps with abbreviations, perhaps in multiple natural languages, are enumerated. For example "Tuesday", "Tues", "T", "3", and "mardi" (i.e. French) may be synonyms recognized by a same or similar detectors, perhaps with case insensitivity. "T" may also be recognized by a weight detector that understands tons.

In an embodiment, probabilities are preassigned. For example, a "T" may intuitively be more likely to represent Tuesday than tons. In a supervised embodiment, which T's are Tuesdays and which T's are tons is already known in within a (e.g. small, maybe manually curated) reference corpus that may or may not be part of the training corpus. Thus, probabilities for alternate interpretations of "T" may be automatically derived based on the relative frequencies of the interpretations within the reference corpus.

As explained above, detectors may be context free, such as for efficiency. Relative probabilities in isolation (e.g. context free, peephole) may sometimes be misleading. For example, the probability that "T" means tons may be 0.2, which is unlikely, even though the context of the T within a message may actually suggest tons, such as "40 T of coal". Thus there may be an inversion of probabilities, such that a more likely interpretation in isolation is actually less likely in context, or vice versa.

Thus, it may be important that multi-token signature matching not disqualify a match because one or a minority of tokens are low-probability matches. Such tolerance may have implications for signature hashing. Hashing should generate somewhat generalized (i.e. vague) hash codes that can still match regardless of fuzziness. Somewhat similar signatures should have a same hash code to prevent a false negative (i.e. no match).

For example, message hash code 363 of current message 321 may be compared to hash codes of two clusters, such as 311-312. In that case, as a preliminary tactic, a double match (e.g. a true match and a false match) may be better than a false negative where the correct cluster is falsely disqualified. Thus, hash collisions may be somewhat encouraged. For example, clusters 311-312 have shared hash code 364. Cluster hash collisions can be correctly resolved (i.e. a correct cluster selected) for current message 321 by a more or less exhaustive and probabilistic matching, token by token within each signature, to find the most likely matching signature, such as when comparing signatures 331 and 333 to each other.

To encourage hash collisions, a hash formula should not be too specific, detailed, or complex. A hash formula may be based on a count of tokens, names of fields, such as 371-372, and token values that include only more or less meaningless (e.g. grammatical) punctuation, such as 315-316, that is unlikely to be part of a variable (i.e. typed) token. For example, a period may occur within a real number or an internet address and thus is not meaningless. In an embodiment, hashing is implemented with a non-cryptographic hash library such as SpookyHash or other hashing by Bob Jenkins that are designed for efficient hashing of strings of characters or bytes.

A signature sequence of three unsigned integer tokens should have a same hash code as a signature sequence of three real number tokens, because a fuzzy "4 5 6" may actually mean "4.0 5.0 6.0". For example within fuzzy token 342, data type 381 may be unsigned integer, and data type 382 may be floating point. Likewise, a fuzzy "11778899" may actually be a hexadecimal variable that should also accommodate "7AA27BCB", or may even be an alphanumeric variable that should also accommodate "WXYZ123Q".

Each of raw text values 11778899, 7AA27BCB, and WXYZ123Q may actually occur in a same token position of three respective messages. At that same token position may be three different respective (e.g. fuzzy) tokens for those three messages. Because 11778899, 7AA27BCB, and WXYZ123Q may all match an unstructured alphanumeric type, the three messages have signatures with respective fuzzy tokens that include at least an unstructured alphanumeric type.

Even though the three respective fuzzy tokens share the unstructured alphanumeric type as a candidate data type, some of the respective tokens may have additional data type(s) that are not shared by all of the respective tokens. For example, the fuzzy token for value 7AA27BCB may also have a hexadecimal type as a candidate type, which the fuzzy token for WXYZ123Q cannot have. Thus, multiple fuzzy tokens at a same position may have partially overlapping sets of possible data types.

In that case, it is possible that messages having partial overlap of data types at each token in their signatures may have been generated from a same original format string and may belong in a same cluster. Thus, a hash formula should not be based on particular data types nor discriminate between a data type and a more or less untyped literal. Whereas, some differences between multiple message signatures may be more or less irreconcilable and should prevent assignment to a same cluster. For example, signature token sequences of different lengths should be incompatible. Apparently incompatible signatures might later be harmonized as described later herein. In an embodiment, token value data types include an internet protocol (IP) address, a hostname, a user name, a media access control (MAC) address, a number format, or a format of a time and/or date.

In an embodiment, there is a generic type of fixed low probability that is fully generalized so as to match any raw untyped substring. In an embodiment, that low probability is less than most or all non-zero probabilities that strongly typed detectors may return. In an embodiment, that generic type does not match reserved punctuation such as 315-316. Every fuzzy token includes the generic type as one of the token's candidate data types. Thus in some cases, two signatures of a same token sequence length are more or less prone to match.

There are additional factors that may prevent such generic matching by design. As described above, signature matching is probabilistic, such that a message may be assigned to a cluster with a highest probability signature match. An embodiment may have a threshold that a match probability must exceed. For example, if most or all tokens between two signatures can match only based on the generic data type, then the match score may be too low to recognize as a signature match.

Field names are another way to prevent false matching. For example, two tokens with field names, such as 371-372, can match only if the field names match. Field name may be part of a hashing formula. Signature hashing may be based on token hashing, such that each token has a hash code (not shown). For example, a hash code of token 341 may be based on hash code 362 of field name 371 and/or, in special cases because variable data generally is an unsuitable hash key, hash code 361 of value 305. Hash codes may be lazily calculated and retained (e.g. cached).

As explained above, tokens and signatures of messages and clusters may be fuzzy, which entails multiple candidate data types. Initially, a new cluster has only one message. The cluster signature initially is the same as the signature of that one message. As additional messages join the cluster, the cluster signature may evolve in a way that is counter intuitive. Additional messages may contain additional actual values that may broaden the value range of a cluster token within the cluster signature. A broader range of encountered actual values may instead counter intuitively cause a narrowing of the possible data types of a fuzzy token by eliminating some candidate data types.

Any data type can be promoted to the generic wildcard type if needed. The mechanism for this entails initially including the generic wildcard type as a candidate type in all fuzzy tokens and then, by narrowing as described herein, removing candidate types from a fuzzy token until perhaps only the generic wildcard type remains. For example, clustering activities such as de-fuzzing, merging, and splitting as described later herein may reduce a fuzzy token into a concrete token having only the generic wildcard type.

4.0 Example Parser Lifecycle

Figure 4:
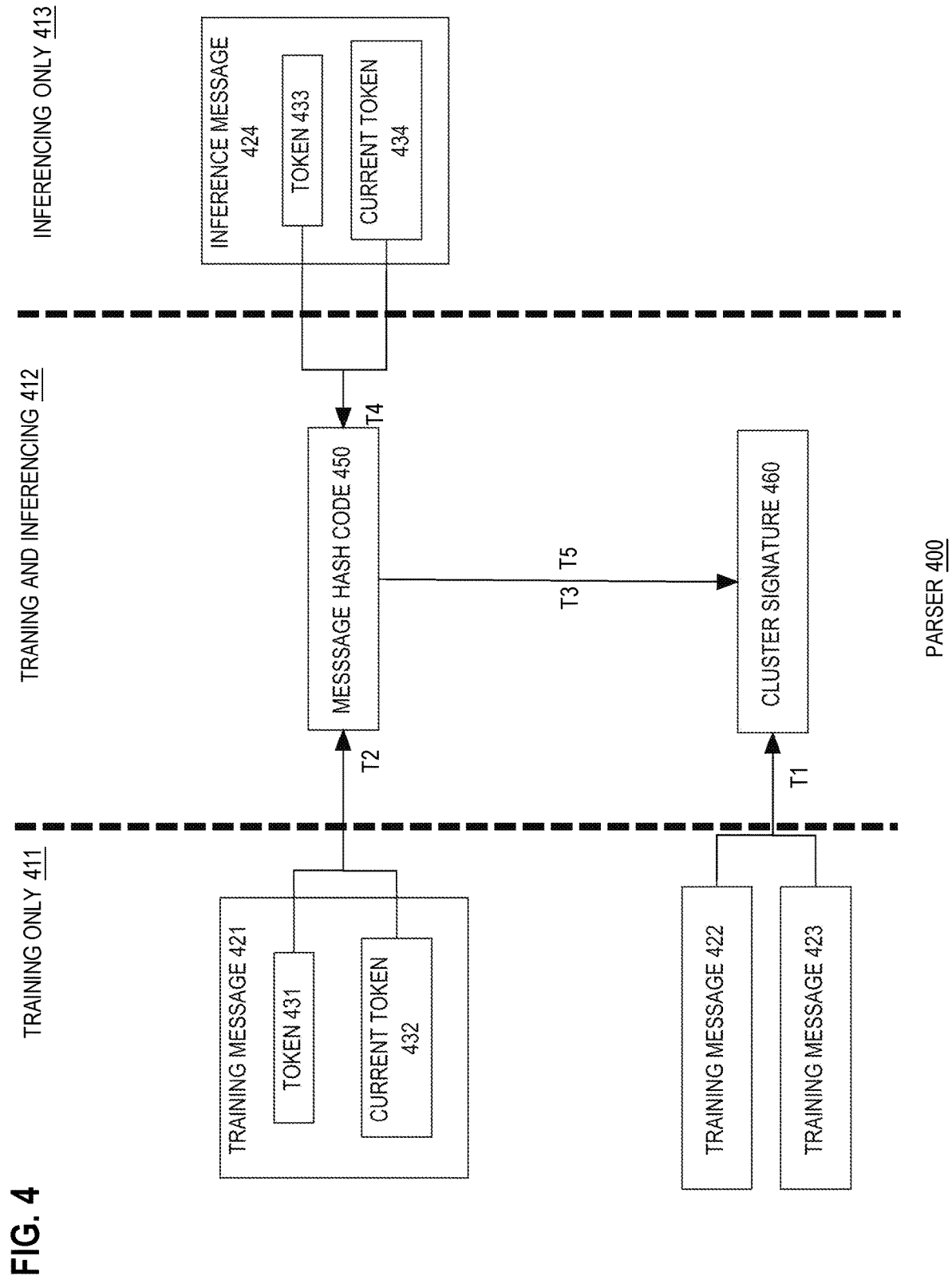
FIG. 4 is a block diagram that depicts an example lifecycle of an example message parser.

FIG. 4 is a block diagram that depicts a lifecycle of an example message parser 400, in an embodiment. Cluster signatures of parser 400 are created during training and then used during inferencing, such as in production. FIG. 4 shows a similarity of behavior for training and inferencing by a parser. Parser 400 may be an implementation of the parser of computer 100.

The lifecycle of parser 400 has two primary phases, training and inferencing. For demonstration, the data structures of FIG. 4 are temporally arranged from left to right and divided into three vertical bands, show separated by bold dashed vertical lines. The left band, training only 411, shows data structures only needed during training, including a corpus of training messages 421-423. Such training data structures are not propagated into production and may be discarded or retained in a training laboratory for future retraining.

The right band, inferencing only 413, shows data structures only needed for inferencing, such as in production. That includes any live messages to be parsed by parser 400, such as inference message 424. Live messages may be delivered to parser 400 one by one, such as in a data stream, or in bulk, such as in a batch and/or from a (e.g. log) file.

Training and inferencing may occur at separate times, with some data structures being accessible only during a particular phase. For example parser 400 has access to either training messages 421-423 or inference message 424, but not both during a same lifecycle phase.

The core data of parser 400 itself is needed during training and inferencing, shown as the middle band, training and inferencing 412. The primary data structure of parser 400 is cluster signatures, such as 460. Message signatures and hash codes, such as 450, are needed by the parser for cluster activity, such as cluster selection and maintenance. Cluster signature 460 is configuration data that is learned during training and consulted during inferencing. Message signatures and hash codes, such as 450, are more or less ephemeral data that dynamically arise during parser operation generally.

The lifecycle of parser 400 encompasses times T1-T5. Times T1-T3 occur during training and may be repeated, such as once per training message. At time T1, some training has already occurred, and some training messages of the training corpus have already been processed. For example, training messages 422-423 are assigned to a same cluster that has cluster signature 460.

At time T2, a next training message is processed. For example, training message 421 is split into tokens 431-432. A message signature (not shown) is created for training message 421 based on tokens 431-432. Message hash code 450 is calculated from the message signature by a hash function. The hash function may be based on a count of tokens and field names of tokens. The hash function may ignore data types of tokens.

At time T3, a best matching cluster is selected. For example, a cluster may have cluster signature 460, that has a cluster hash code (not shown) that matches message hash code 450. A match score may be calculated based on match scores of tokens 431-432 to tokens (not shown) of cluster signature 460. If the match score falls below a threshold, then there is no match. If multiple clusters have a same cluster hash code, then message hash code 450 may match multiple clusters. Parser 400 may assign training message 421 to one cluster based on a highest cluster match score for training message 421.

After all training messages are processed, parser 400 may perform some post processing such as de-fuzzing to select best data types for fuzzy tokens and cluster merging to combine partial results from parallel training processors. After post processing, the trained parser may durably save or transmit its configuration for later loading into a parser in a production environment. Trained parser configuration consists primarily of de-fuzzed cluster signatures, without the clustered messages.

Times T4-T5 occur in production. A production parser has been loaded with de-fuzzed cluster signatures. The production parser has more or less the same tokenization and signature matching logic as the training parser. However, the production parser does not retain processed messages. For example, the production parser can match a live message to a cluster signature, but would not add the live message to a cluster. For example in production, cluster signature 460 is not associated with a cluster of processed messages.

At time T4, a live message such as 424 is received and tokenized into tokens 433-434 more or less as tokenizing occurred at time T2 in training. This entails calculating a message signature (not shown) for inference message 424. Message hash code 450 may be generated from the message signature.

At time T5, a best matching cluster signature is selected more or less as cluster matching occurred at time T3 in training. For example, a cluster signature may be selected that has a same signature hash code as message hash code 450. Match scoring can be used to select a best matching cluster signature if multiple cluster signatures have a same signature hash code. The best matching message signature may then be used to extract typed data from within tokens 433-434. In an embodiment, static literals that occur in every message of a training cluster are not extracted as values in production. Thus, invariant substrings may be omitted from parser output and not reported to downstream consumers.

Production parser 400 may be embedded or otherwise integrated with a software application (not shown). Also at time T5, the extracted typed data may be provided to the software application for meaningful handling. In an example, the software application uses extracted typed data to perform filtration and/or routing to one of several data sinks, such as a file, database, or a software handler within the same or other software application. For example, a software handler may detect that an extracted numeric value exceeds a threshold and raise an alarm. Thus, operation of production parser 400 may be more or less at the beginning of a more or less complex analytic pipeline through which live messages flow.

In practice, structures and values of production message traffic may evolve as computers and other network elements are added, upgraded, or removed. For example, some literals of an enumeration variable of an original format template may fall into disuse. Cluster signatures of production parser 400 may become less suitable, which may reduce accuracy and/or efficiency. Parser 400 may be retrained using a more recent and more representative training corpus of messages. Thus, the lifecycle of parser 400 may actually be more or less cyclic. Parser 400 may be directly retrained or indirectly retrained by reloading message signatures from a more recently trained training parser.

5.0 Example Cluster Signature

Figure 5:
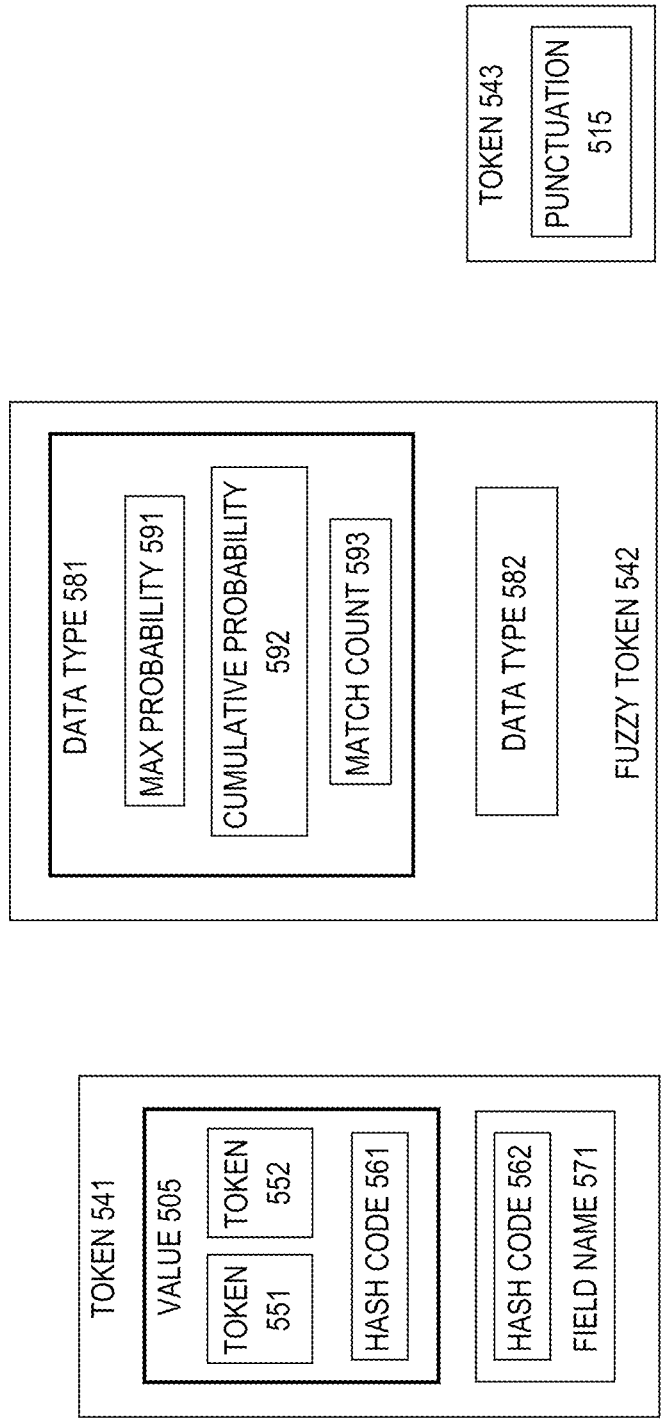
FIG. 5 is a block diagram that depicts an example cluster signature.

FIG. 5 is a block diagram that depicts an example cluster signature 500, in an embodiment. Cluster signature 500 may become disambiguated. Cluster signature 500 may be part of an implementation of computer 100.

Parser training may occur in two phases. A first phase occurs as described above herein, which entails tokenization and clustering. A second phase entails merging of clusters and de-fuzzing, which is disambiguation, of cluster tokens and cluster signatures as follows.

De-fuzzing occurs before cluster merging. De-fuzzing cluster signature 500 entails converting fuzzy tokens, such as 542, that each represent multiple types into concrete tokens that each represent one type. A concrete token may have either one string literal, such as punctuation 515, a typed variable, such as 541, or an untyped/generic (i.e. raw text) variable whose range of values may, but need not, be recognizable by any other detector.

Fuzzy token 542 encodes multiple scores for each data type. For example, data type 581 has cumulative probability 592 that is an aggregated likelihood as a sum of a detector's 0 to 1 return value across the corresponding token of every message in the cluster. Match count 593 is a total number of non-zero (or exceeding a threshold) scores from the detector across the corresponding token of every message in the cluster. Max probability 591 is a highest probability from the detector across the corresponding token of every message in the cluster.

To de-fuzz fuzzy token 542, its candidate data type with a highest cumulative probability is retained, and other candidate data types are forgotten for token 542, which converts 542 from a fuzzy token to a concrete token. In an embodiment, candidate type detector scoring is based on hand crafted formulae and/or expert heuristics. In an embodiment, type scoring is automated based on value range size and/or potential value overlap, or value range overlap, of multiple data types.

Overlap and ambiguity do not need explicit recognition and handling beyond what fuzzy tokens already provide as discussed above. For example, neighboring signature tokens may influence cluster signature evolution in a way that inherently resolves ambiguity in a signature token. For example, "orange" may appear in two tokens of a same message and correctly resolve as a color data type in one token and a fruit data type in another token. Despite such inherent robustness, some embodiments may have additional scoring heuristics as follows.

In an embodiment, a narrower data type has a higher match score than a broader data type when both data types match a same value. For example, an unsigned integer may have a higher score than a signed integer. In an embodiment, an enumeration data type with less literals may generate a higher score than another enumeration data type with more literals. For example, "true" may score higher as a Boolean than "December" as a month. In an embodiment, a fixed string literal that stands alone as its own data type has a highest match score of all data types.

In an embodiment, ambiguous literals score lower than unambiguous literals. For example with months, "December" may score higher than "April" that may also be a person's first name. In an embodiment, detection of ambiguity may be automated. For example, automated analysis of detectors (e.g. detector metadata) may discover that "orange" is a literal of a color data type and a literal of a fruit data type, which may automatically adjust scoring formulae of some detectors.

Sometimes the generic type has a highest cumulative probability of any candidate data type in a fuzzy token. If multiple candidate types have a same cumulative probability, then statistics such as max probability 591 and/or match count 593 may be used as tie breaking values.

Token 541 is compound, such as with nested data structures. For example, original messages may be encoded as JavaScript object notation (JSON) which naturally has nesting structures such as dictionaries and arrays. For example, value 505 may be an array that contains tokens 551-552 that may be fuzzy, concrete, or compound. Nesting depth is potentially unlimited. Rather than expect known nesting arrangements, a JSON parser can match braces and square brackets to detect depth. For example, the parser may have context free operation and may be a push down parser, without needing static syntax. Nesting and flattening examples are presented later herein.

The cluster signature fuzzy tokens also store every literal string value that was seen for the token. If only one literal string value was ever seen for the token, it is promoted to a static (literal) token, such as 543. In an embodiment, some data types are not reduced to a literal token, even when only one value is observed in training. For example, a number may always be a typed variable. For example, a named variable such as "errors=0" should accommodate more than zero errors, even if the training corpus always has zero errors announced in messages.

De-fuzzing is imperfect because even a best data type need not be a match for all observed values of fuzzy token 542. For example, a count of messages in the cluster may exceed match count 593, such that some of those messages do not parse as data type 581. After all fuzzy tokens of cluster signature 500 are de-fuzzed, the messages in the cluster are tested to see if they still match the signature. Only some or none of the messages may still match cluster signature 500.

When some messages still match, the mismatched messages are moved to a new cluster. The signature of the new cluster depends on the embodiment. For example, the new signature may be composed entirely of generic tokens that match everything. Instead, the new signature may be more or less a clone of the old signature, with mismatching tokens replaced with generic tokens or replaced with variables that enumerate possible literals.

If none of the messages match the de-fuzzed signature, a fail-safe mode engages that makes a replacement signature out of the first message in the cluster and immediately de-fuzzes the replacement signature. The other messages are then re-added to the cluster only if they match the de-fuzzed signature. Signature updates may occur, but a token will not convert back to fuzzy. That guarantees that at least some of the messages will match, and any messages that cannot match are moved to a new cluster as described above.

Similar clusters may emerge and be merged. For example, training as described above is parallelizable. For example, each processing core of a CPU may train with a partition (i.e. subset) of the shared training corpus. That may cause a similar cluster signature for each of multiple cores. In an embodiment, after de-fuzzing in parallel, clusters with matching signatures are merged, which may somewhat adjust a cluster signature to accommodate value(s) of one cluster that a similar cluster did not encounter. If a first processing core finishes before a second core and with some synchronization, cluster merging need not wait for the second core to finish. In another embodiment, the ordering of activities is reversed, and matching signatures are merged before de-fuzzing to yield more deterministic results.

When merging two concrete tokens that share a same data type, either token may be retained. Merging two concrete tokens that have somewhat similar data types may depend on how the value ranges overlap. If one value range contains the other value range, then the data type with the broader value range should be retained. Otherwise both data types may become candidate types in a new fuzzy token, which can become de-fuzzed as explained above.

6.0 Example Fuzzy Parser

Figure 6:
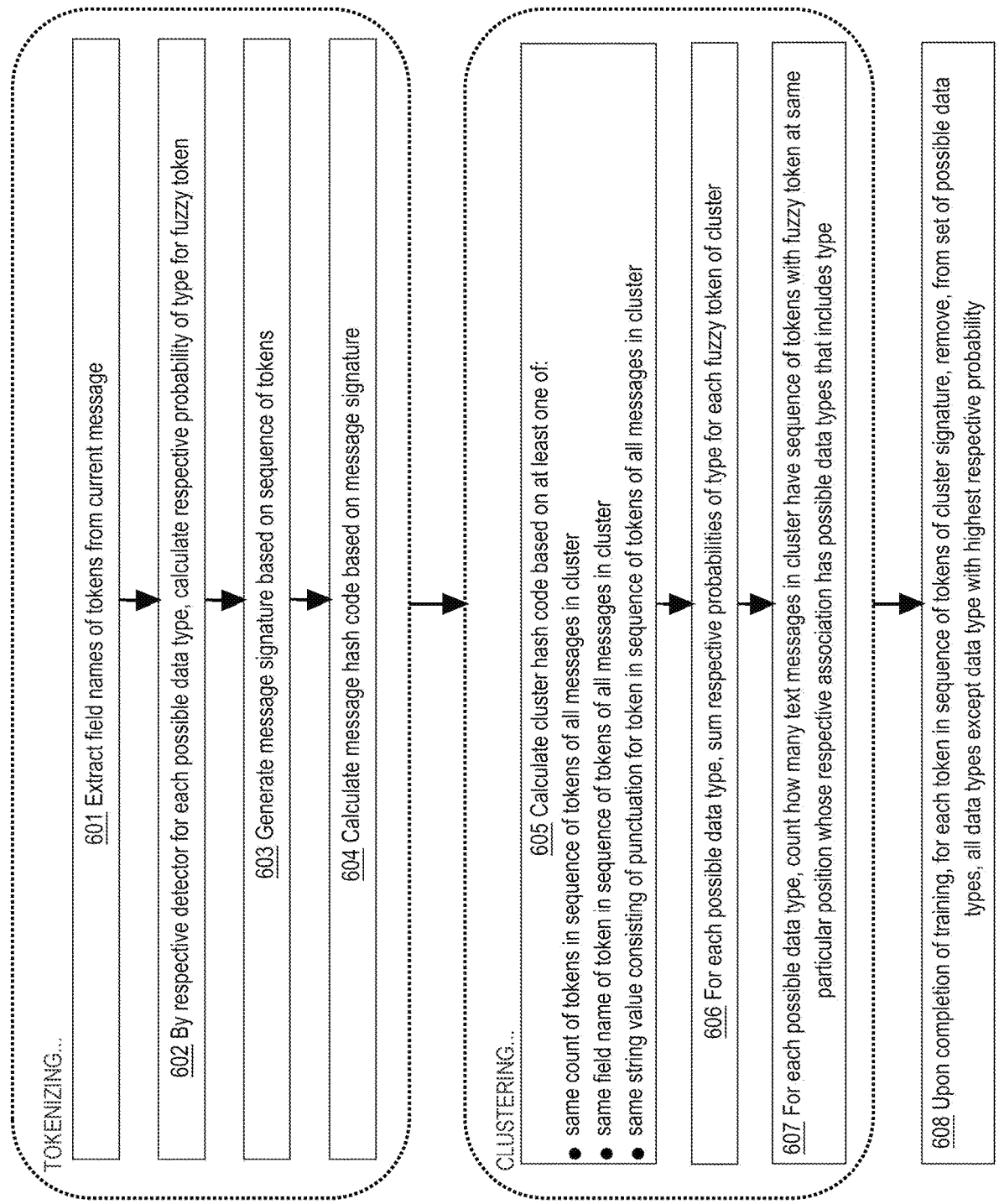
FIG. 6 is a flow diagram that depicts an example computer process for training a fuzzy parser.

FIG. 6 is a flow diagram that depicts a process for training a fuzzy parser, in an embodiment. FIG. 6 is discussed with reference to FIGS. 3 and 5.

Training has two general activities, tokenizing and clustering, that occur for each training message of a training corpus. Tokenizing includes steps 601-604. Clustering includes steps 605-607. The steps shown may be an incomplete set of activities that may occur during training. The relative ordering of the shown steps may be implementation dependent.

In step 601, a current training message is split into tokens. Some tokens may have field names, which are extracted and associated with neighboring values that are extracted. A name and a value, as extracted, may be encapsulated within a message token.

In step 602, candidate types and probabilities of each message token are detected. For example, an extracted value for a token may be submitted to some or all available data type detectors for recognition and scoring. If multiple detectors report sufficient probabilities, then a fuzzy token may be created that contains many candidate data types and their respective probabilities. A sum of probabilities of candidate data types of a fuzzy token may exceed one.

Step 603 generates a message signature for the current message based on the sequence of tokens extracted from the message. Step 604 calculates a message hash code from the message signature. Hashing is a performance optimization. Parsing in training or production may succeed without hashing and based on direct signature matching instead. However, matching a message hash code to a hash code of one or more cluster signatures may occur in constant time. Whereas, direct signature matching occurs in linear time for one cluster signature and quadratic time for comparing with all cluster signatures.

Clustering occurs during steps 605-607, which need not occur at a same frequency as each other. For example, step 605 need not occur for every training message. Whereas, steps 606-607 may be repeated for each candidate data type of each fuzzy token of a signature of a cluster whenever a training message is added to the cluster.

Step 605 occurs in training whenever a cluster signature is modified by adding a training message to a cluster. As explained herein, adding a message to a cluster may cause the cluster to divide into two or more clusters. For example, adding a message may cause generalization of one or more tokens of a cluster signature, which may cause matching scores of training messages already in the cluster to drop beneath the clustering threshold, which in turn may cause one or more training messages to be evicted from the cluster and assigned to newly created cluster(s). A cluster hash code may be based on any of: a) a same count of tokens in the sequences of tokens of all messages in the cluster, b) a same field name of a token in the sequences of tokens of all messages in the cluster, and/or c) a same string value consisting of punctuation for a token in the sequences of tokens of all messages in the cluster.

When a training message is added to a cluster, step 606 sums each candidate type probability into a running (i.e. cumulative) total for each candidate type of each fuzzy token of the cluster's signature. For example with candidate data type 581, an extracted value of a second token of a current training message may have a data type match probability of 0.5, which may be added into cumulative probability 592 of fuzzy token 542. Cumulative probability 592 may (e.g. greatly) exceed one due to accumulating type match probabilities of many training messages.

When step 606 yields a type match probability that exceeds a match threshold, then there is a type match, in which case step 607 occurs. In step 607, match count 593 is incremented for that data type in that fuzzy token, but not for the same data type in other fuzzy tokens of a same or different cluster signature. That is, each fuzzy token has its own probabilities 591-592 and match count 593 for each of the fuzzy token's candidate data types, even when other fuzzy tokens have a same candidate data type.

Max probability 591 is updated during step 607 if the type match probability of step 606 exceeds max probability 591. Thus, a high water mark for match probability is maintained for each candidate data type of each fuzzy token of each cluster signature. Consumption of running values 591-593 is as follows.

Step 608 is a training post processing step that occurs after every training message of the training corpus has been processed. Step 608 performs de-fuzzing, which is type disambiguation. Step 608 entails using some or all of running values 591-593 to select a best data type for a fuzzy token, such as 542. In an embodiment, running values 591-593 are weighted and then summed to achieve a type score. Whichever of data types 581-582 has a highest type score is selected as the best type for fuzzy token 542. Various embodiments may use one of running values 591-593 as a tie-breaker when two candidate data types have a same score.

De-fuzzing entails removing all but the best candidate type from token 542 to convert the token from a fuzzy token into a concrete token. A concrete token has only one data type, which may be a string invariant, a variable of one specific data type, or the generic wildcard that matches any raw substring.

All fuzzy tokens of all cluster signatures should be de-fuzzed. When a signature of a cluster is de-fuzzed, match scores for that token may decrease for some training messages in the cluster, which may reduce match scores between the cluster signature and message signatures. Some signature match scores may become zero or fall beneath a threshold, such that some messages should be removed from the cluster. Thus, de-fuzzing may split some clusters, which creates new clusters to which messages that no longer match old clusters should be assigned. Indeed, de-fuzzing may even cause all messages of a cluster to no longer match the cluster signature.

7.0 Example Operation

The following is an example operation of parser in training that uses a demonstrative notation to informally reveal state and activity of the parser. Square brackets enclose each cluster signature token. Vertical pipe characters enumerate candidate types of a fuzzy token and/or enumeration literals of a fuzzy or concrete token. Colons precede fuzzy probabilities. Text entirely capitalized are candidate type names. Other text are literals, which are enumeration literals inside tokens or static literals outside of tokens.
Cluster signature: "The [COLOR:1|GENERIC:0.2|green|red] [VEHICLE:1|GENERIC:0.2|truck|car] picked up the apple"
Candidate message: "The blue car picked up the strawberry"
"The" is a perfect match so gets a score of 1.
"[COLOR:1|GENERIC:0.2|green|red]" represents a simplified fuzzy token in the signature, with two variable types and two static strings. The "blue" token in the message gets recognized as a color with 100% probability, so it also gets a score of 1 and the signature's fuzzy token gets updated to "[COLOR:1|GENERIC:0.2|green|red|blue]".
The next signature token includes the value for "car" already, so no update is needed.
The next three tokens, "picked", "up", and "the" are perfect matches with no cluster signature updates needed.
The next token does not match, but when running in learning mode, the signature's static "apple" token can be promoted to a fuzzy token. A detector recognizes both "apple" and "strawberry" as fruits, so the signature token gets updated to "[FRUIT:1|GENERIC:0.2|apple|strawberry]".

8.0 Nesting and Flattening Examples

In an embodiment, a log message may include JSON and/or JSON-like structures. A log message may also contain variable-length arrays, such as one variable-length array nested within another variable-length array. In an embodiment, log parser signature generation specially handles variable-length arrays because otherwise each variation of array length might generate a new signature. However, this does not include support for variable-length signatures, which might complicate subsequent processing such as downstream. In an embodiment, a whole array may operate as a single monolithic value of a token. The following is a parsed message with a whole array as a field value.

```
{
    "FieldName": "key",
    "FieldType": "String",
    "FieldValue": [
        "value1",
        "value2"
    ]
}
```

In JSON, arrays and dictionaries may be more or less arbitrarily nested, such as with the following unparsed message.

```
{
    array=
    [
        dictionary=
        {
            address=192.168.0.1,
            user=francis
        },
        dictionary=
        {
            address=192.168.0.2,
            user=ajax
        }
    ]
}
```

A flattening parser may parse the above unparsed message into the following parsed message.

```
{
    "FieldName": ".array[ ].dictionary.address",
    "FieldType": "NetworkAddress",
    "FieldValue": [
        {
            "IPv4": "192.168.0.1"
        },
        {
            "IPv4": "192.168.0.2"
        }
    ]
},
{
    "FieldName": ".array[ ].dictionary.user",
    "FieldType": "String",
    "FieldValue": [
        "francis",
        "ajax"
    ]
}
```

Details of the above flattened parsed message are as follows. The leading '.' in the field names represents the root level dictionary, which is unnamed. The empty square brackets following "array" show that the field named "array" is an array object that is flattened. The unparsed array of dictionaries has two elements, and each flattened array has two elements.

Awareness of how data is associated may be important to a downstream machine learning algorithm. For example, a log may have grouped data into dictionaries for an informative reason. For example as shown above, Francis is associated with 192.168.0.1, not with 192.168.0.2. The order of the arrays matters, and index N of each array is associated with index N of the other arrays. These as so-called parallel arrays that may share internal offsets to elements. The naming of the fields may also be important for how the data is organized. The following is another example unparsed message.

```
{
    array=
    [
        dictionary=
        {
            address=192.168.0.1,
            {
                user=francis,
                age=29
            }
        },
        dictionary=
        {
            address=192.168.0.3,
            port=22,
            {
                user=ajax
            }
        }
        dictionary=
        {
            address=192.168.0.2,
            {
                user=wade,
                age=30
            }
        }
    ]
}
```

As shown above, an unnamed dictionary is nested within a named dictionary. As shown above, Ajax is missing an age, but specifies a port, and may be yield the following parsed message.

```
{
    "FieldName": ".array[ ].dictionary..age",
    "FieldType": "UInteger",
    "FieldValue": [
        29,
        null,
        30
    ]
},
{
    "FieldName": ".array[ ].dictionary..user",
    "FieldType": "String",
    "FieldValue": [
        "francis",
        "ajax",
        "wade"
    ]
},
{
    "FieldName": ".array[ ].dictionary.address",
    "FieldType": "NetworkAddress",
    "FieldValue": [
        {
```

```
        "IPv4": "192.168.0.1"
      },
      {
        "IPv4": "192.168.0.3"
      },
      {
        "IPv4": "192.168.0.2"
      }
    ]
  },
  {
    "FieldName": ".array[ ].dictionary.port",
    "FieldType": "UInteger",
    "FieldValue": [
      null,
      22,
      null
    ]
  }
```

As shown above, the extra '.' before "age" and "user" indicates that they are in a separate but unnamed sub-dictionary. Because the unparsed array has three elements, every flattened parsed array should also have three elements, with nulls inserted where fields are missing.

The following is an unparsed message with nested arrays.

```
{
  array=
  [
    dictionary=
    {
      address=192.168.0.1,
      users=
      [
        francis,
        wade
      ]
    },
    dictionary=
    {
      address=192.168.0.3,
      users=
      [
        vanessa,
        dopinder,
        jared,
        ajax
      ]
    }
    dictionary=
    {
      address=192.168.0.2
    }
  ]
}
```

The above unparsed message may yield the following parsed message.

```
{
  "FieldName": ".array[ ].dictionary.address",
  "FieldType": "NetworkAddress",
  "FieldValue": [
    {
      "IPv4": "192.168.0.1"
    },
    {
      "IPv4": "192.168.0.3"
    },
    {
      "IPv4": "192.168.0.2"
    }
```

```
  ]
  },
  {
    "FieldName": ".array[ ].dictionary.users.00000000.",
    "FieldType": "String",
    "FieldValue": [
      "francis",
      "vanessa",
      null
    ]
  },
  {
    "FieldName": ".array[ ].dictionary.users.00000001.",
    "FieldType": "String",
    "FieldValue": [
      "wade",
      "dopinder",
      null
    ]
  },
  {
    "FieldName": ".array[ ].dictionary.users.00000002.",
    "FieldType": "String",
    "FieldValue": [
      null,
      "jared",
      null
    ]
  },
  {
    "FieldName": ".array[ ].dictionary.users.00000003.",
    "FieldType": "String",
    "FieldValue": [
      null,
      "ajax",
      null
    ]
  }
}
```

The users field name has an index appended to it. The longest users array has four elements, with indices range from 0 to 3. The third dictionary has no users, so the third entry in every array is null.

The trailing '.' in the above user field names is there because users in the list do not have field names. If all uses instead had "user=" in front of them, one user would look like the following.

```
        "FieldName":
          ".array[ ].dictionary.users.00000001.user",
        "FieldType": "String",
        "FieldValue": [
          "wade",
          "dopinder",
          null
        ]
```

The following is a more involved example unparsed message.

```
  dictionary=
  {
    address=192.168.0.1,
    users=
    [
      bad=francis,
      good=wade
    ]
  },
  dictionary=
  {
    address=192.168.0.3,
    users=
```

```
                [
                    good=vanessa,
                    good=dopinder,
                    bad=jared,
                    bad=ajax
                ]
            },
            dictionary=
            {
                address=192.168.0.2
            }
```

From the above unparsed message may be generated the following parsed message.

```
{
    "FieldName":
".array[ ].dictionary.users.00000000.bad",
    "FieldType": "String",
    "FieldValue": [
        "francis",
        null,
        null
    ]
},
{
    "FieldName":
".array[ ].dictionary.users.00000000.good",
    "FieldType": "String",
    "FieldValue": [
        null,
        "vanessa",
        null
    ]
},
{
    "FieldName":
".array[ ].dictionary.users.00000001.good",
    "FieldType": "String",
    "FieldValue": [
        "wade",
        "dopinder",
        null
    ]
},
{
    "FieldName":
".array[ ].dictionary.users.00000002.bad",
    "FieldType": "String",
    "FieldValue": [
        null,
        "jared",
        null
    ]
},
{
    "FieldName":
".array[ ].dictionary.users.00000003.bad",
    "FieldType": "String",
    "FieldValue": [
        null,
        "ajax",
        null
    ]
}
```

The above message flattening techniques are well suited for parsing logs of various important internet services. For example, the internet of things (IoT) involves global communications over more or less insecure infrastructure. Security may be achieved with solutions such as Infocert's MID PKI cryptogaphy framework. An unparsed MID PKI log message may have a nested array that contains many (e.g. more than a hundred) integers as follows.

```
{
    array=
    [
        dictionary=
        {
            address=192.168.0.1,
            users=
            [
                francis,
                wade
            ],
            integers=[4,5,156,235,3,35,23,5,34,25,42,246,24,56,2
45,24,5,24,6,245,246,214,6,6,26,6,145,21,45,125,12,5,241,52,4,4,
6]
        },
        dictionary=
        {
            address=192.168.0.3,
            users=
            [
                vanessa,
                dopinder,
                jared,
                ajax
            ],
            integers=[1,2,3,4,5,6]
        }
        dictionary=
        {
            address=192.168.0.2
        }
    ]
}
```

Because the individual values within a numeric array may be more or less individually interesting, a more compact array encoding may be suitable. For example, if all of the array values are integers that have 8 bits (0-255), the parser may convert the array into a concatenation of hex strings. In such an embodiment, the above unparsed message may yield the following parsed message.

```
{
    "FieldName": ".array[ ].dictionary.address",
    "FieldType": "NetworkAddress",
    "FieldValue": [
        {
            "IPv4": "192.168.0.1"
        },
        {
            "IPv4": "192.168.0.3"
        },
        {
            "IPv4": "192.168.0.2"
        }
    ]
},
{
    "FieldName": ".array[ ].dictionary.integers",
    "FieldType": "HexString",
    "FieldValue": [
        "04:05:9c:eb:03:23:17:05:22:19:2a:f6:18:38:f5:18:05:18:0
6:f5:f6:d6:06:06:1a:06:91:15:2d:7d:0c:05:f1:34:04:04:06",
        "01:02:03:04:05:06",
        null
    ]
},
{
    "FieldName": ".array[ ].dictionary.users.00000000.",
    "FieldType": "String",
    "FieldValue": [
        "francis",
        "vanessa",
        null
    ]
},
{
```

```
        "FieldName": ".array[ ].dictionary.users.00000001.",
        "FieldType": "String",
        "FieldValue": [
            "wade",
            "dopinder",
            null
        ]
    },
    {
        "FieldName": ".array[ ].dictionary.users.00000002.",
        "FieldType": "String",
        "FieldValue": [
            null,
            "jared",
            null
        ]
    },
    {
        "FieldName": ".array[ ].dictionary.users.00000003.",
        "FieldType": "String",
        "FieldValue": [
            null,
            "ajax",
            null
        ]
    }
```

In an embodiment, an array of 4-bit integers may become encoded as individual hex digits within a concatenation string. In an embodiment, conversion to a hex string only happens if an integer array is nested inside another array.

The parser may generate a parsed message that logically operates similar to a JSON message, as shown in the above flattening examples. However, some downstream applications (e.g. a trained machine learning model) that consume parsed messages may instead expect a feature vector, which is a dense and fixed-size encoding that typically does not accommodate variations in size such as with messages or arrays. In an embodiment, a feature vector may expect a parsed array to be padded to an empirical maximum length. In an embodiment during training, a parser may maintain and expose a maximum length for each cluster signature array token as observed in the training corpus. For example, the parser may introduce a synthetic token attribute such as "MaxValuesSeenInOneToken" as shown in the following parsed array.

```
        "FieldName": ".array[ ].dictionary.users.00000000.",
        "FieldType": "String",
        "MaxValuesSeenInOneToken": 3,
        "MoreThan1000Values": false,
        "ValuesSeen":
        {
            "vanessa": 1,
            "francis": 1
        }
```

For nested arrays, the above "ValueSeen" is limited to the values that were seen at a specific array index.

9.0 Example Embodiments

The following enumerated embodiments are some examples that may extend embodiments as originally claimed later herein.

A. The method of claim 2 wherein the cluster token specifies the data type comprises the cluster token contains a plurality of distinct values that includes the data value.

B. The method of claim 3 wherein:
the cluster signature comprises a cluster sequence of tokens;
the hash code is based on a size of a sequence of tokens of a signature.

C. The method of claim 5 further comprising calculating, by a respective detector for each type of the plurality of possible data types, the respective probability of the type for a fuzzy token.

D. The method of claim 7 wherein:
the fuzzy token occurs at a particular position in the first sequence of tokens;
the method further comprises counting, for each type of the plurality of possible data types, how many messages in the cluster have a sequence of tokens with a second fuzzy token at the same particular position whose respective association has a second plurality of possible data types that includes the type.

E. The method of claim 6 wherein:
the fuzzy token occurs at a particular position in the first sequence of tokens;
each message of the cluster of messages has a plurality of tokens that includes a second fuzzy token at the same particular position;
the method further comprises, for each type of the plurality of possible data types, summing respective probabilities of the type for said second fuzzy tokens of the cluster.

F. The method of claim 6 wherein a sum of respective probabilities of the plurality of possible data types exceeds one for the fuzzy token.

G. The method of claim 6 wherein the fuzzy token comprises, for each type of the plurality of possible data types, a maximum probability of the probabilities of the type for said second fuzzy tokens of the cluster.

H. The method of claim 5 wherein the plurality of possible data types comprises at least one of: an internet protocol (IP) address, a hostname, a user name, a media access control (MAC) address, a number format, or a format of a time and/or date.

I. The method of claim 12 wherein adding said first message to the cluster comprises adding said first message to a selected cluster having a highest match score of: said cluster and said second cluster.

J. The method of claim 12 wherein, when the match score does not exceed a threshold, said first message is added to a new cluster instead of said cluster.

K. The method of claim 13 wherein:
each token of the sequence of tokens of the cluster signature is associated with a data type;
adjusting the token at same said particular position in the sequence of tokens of the cluster signature to be a generalization of the tokens at same said particular position comprises associating the token at same said particular position in the sequence of tokens of the cluster signature with a compatible data type that is more general than said data type.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
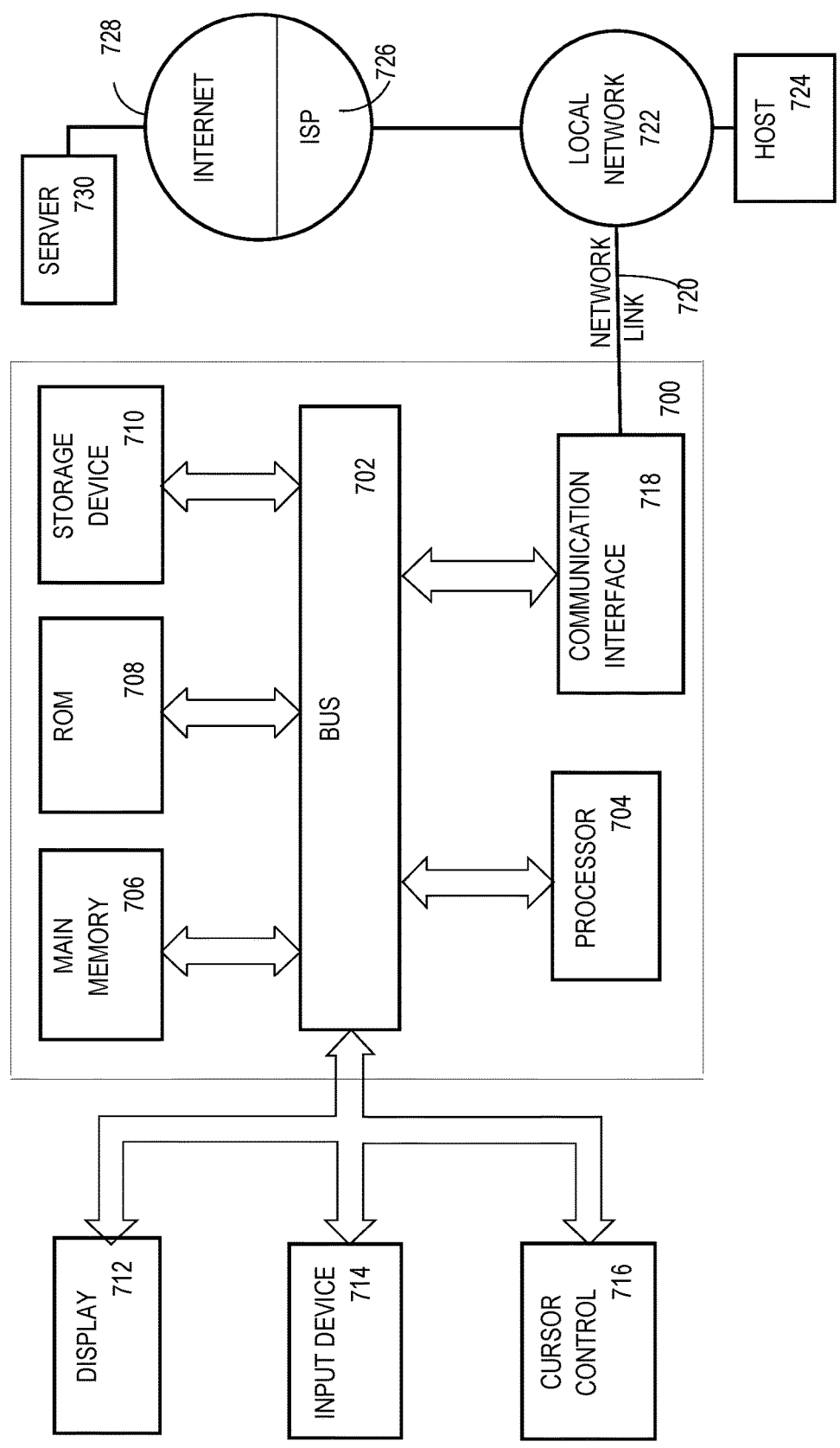
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
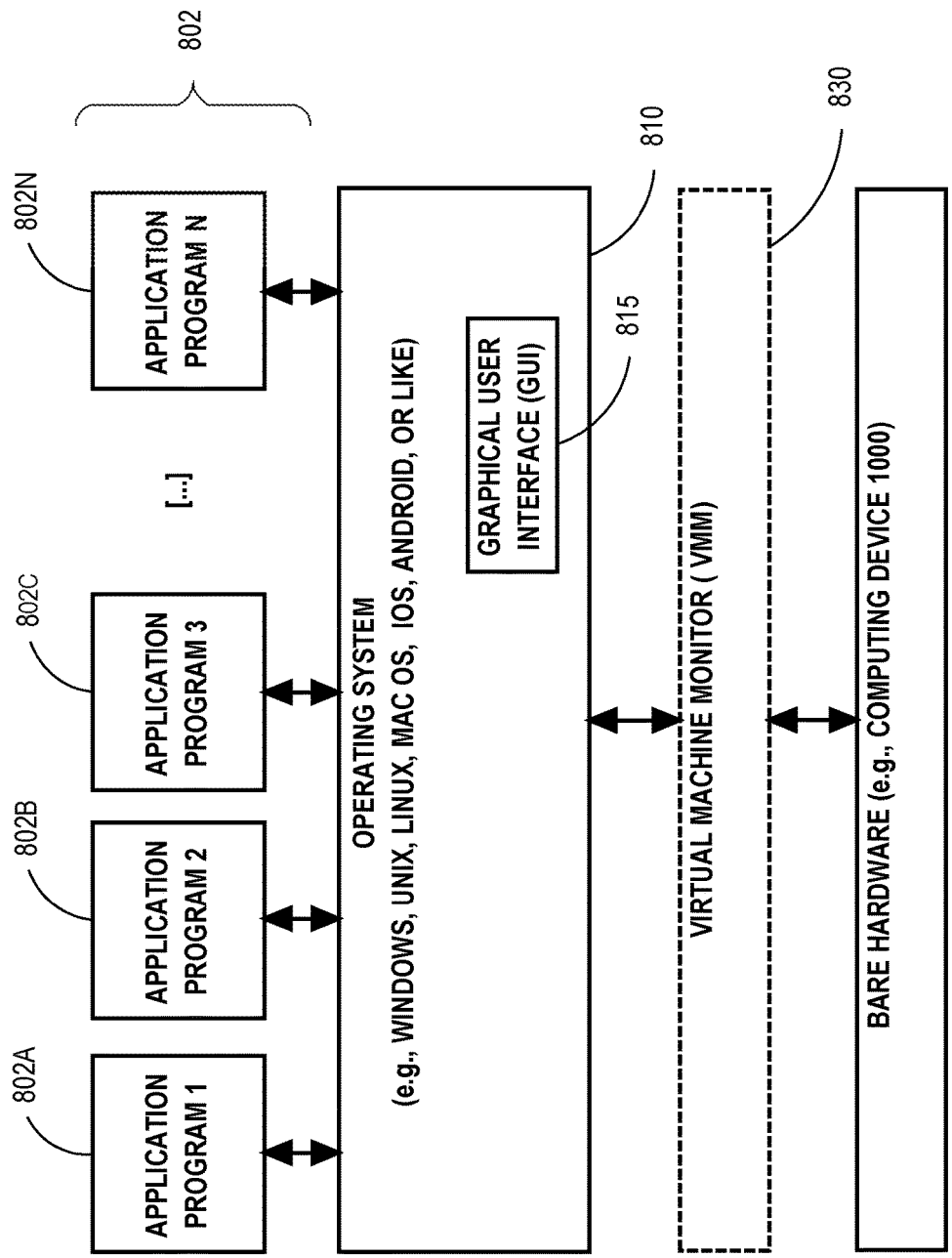
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, based on a message sequence of tokens that were extracted from a training message, a message signature, wherein said message sequence of tokens comprises at least one fuzzy token that specifies a plurality of possible data types for the fuzzy token;
matching the message signature to a cluster signature that represents a plurality of messages of a cluster of a plurality of clusters that have distinct cluster signatures wherein each message in the plurality of messages of the cluster comprises a respective sequence of tokens;
adding the training message to the cluster;
calculating a cluster hash code based on at least one selected from the group consisting of: a same count of tokens in the sequence of tokens of each message in the plurality of messages of the cluster, a same field name of a token in the sequence of tokens of each message in the plurality of messages of the cluster, and a same string value consisting of punctuation for a token in the sequence of tokens of each message in the plurality of messages of the cluster;
selecting the cluster signature based on the cluster hash code;
extracting, based on a data type of the cluster signature, a data value from content of a second message;
wherein the method is performed by one or more computers.

2. The method of claim 1 wherein:
the cluster signature comprises a cluster sequence of tokens that includes a cluster token at a particular position in the cluster sequence of tokens;
a current token occurs at said particular position in the message sequence of tokens;
the data type of the cluster signature comprises the cluster token specifies the data type.

3. The method of claim 1 wherein selecting the cluster signature comprises detecting that a hash code of the message signature is the same as the cluster hash code.

4. The method of claim 1 wherein said cluster and a second cluster of messages comprise said cluster hash code.

5. The method of claim 1 wherein said plurality of possible data types comprises a generic type that is compatible with any value.

6. The method of claim 1 wherein at least one token of the message sequence of tokens comprises at least one selected from the group consisting of: a value and a field name, a hash code of a value, and a hash code of a field name.

7. A method comprising:
training by:
calculating a message hash code based on a first sequence of tokens that were extracted from a first message, wherein:
said first sequence of tokens comprises at least one fuzzy token that specifies a plurality of possible data types for the fuzzy token, and
the at least one fuzzy token comprises a respective association of a respective probability with each type of the plurality of possible data types;
adding said first message to a cluster of messages that have said message hash code; and
generating, based on said cluster of messages, a cluster signature that describes said cluster of messages;
after said training:
extracting a second sequence of tokens from a second message;
calculating said message hash code based on said second sequence of tokens;
selecting, based on said message hash code, said cluster signature; and
parsing, based on a data type of a token of said cluster signature, said second message;
wherein the method is performed by one or more computers.

8. The method of claim 7 wherein the plurality of possible data types does not include a respective association of a type with a respective zero probability.

9. The method of claim 7 further comprising extracting, from the first message, a field name of at least one token of the first sequence of tokens.

10. The method of claim 7 wherein:
the method further comprises generating a message signature based on the first sequence of tokens;
calculating said message hash code is based on the message signature.

11. The method of claim 10 wherein the cluster signature is said message signature when the cluster of messages contains only the first message.

12. The method of claim 10 wherein:
each message of the cluster of messages comprises a message signature;
the cluster of messages has a cluster signature that is compatible with the message signatures of the messages of the cluster of messages;
adding said first message to the cluster of messages comprises, in response to detecting that the message signature of the first message is incompatible with the cluster signature, adjusting the cluster signature to be a generalization of the message signatures of each of: the first message and the messages of the cluster of messages.

13. The method of claim 7 wherein said training comprises training a message parser that is selected, based on the first message, from a plurality of message parsers.

14. The method of claim 7 wherein the first message encodes a hierarchical structure such that at least one token of the first sequence of tokens comprises a value comprising a second sequence of tokens.

15. The method of claim 7 wherein:
the cluster signature comprises a sequence of tokens that includes said token of said cluster signature;

each token of the sequence of tokens comprises a set of possible data types and respective probabilities;

the method further comprises, upon completion of said training, for each token in the sequence of tokens of the cluster signature, removing, from the set of possible data types, all data types except a data type with a highest respective probability.

16. One or more non-transitory computer-readable media storing instructions that, when executed by one or more processors, cause:

generating, based on a message sequence of tokens that were extracted from a training message, a message signature, wherein said message sequence of tokens comprises at least one fuzzy token that specifies a plurality of possible data types for the fuzzy token;

matching the message signature to a cluster signature that represents a plurality of messages of a cluster of a plurality of clusters that have distinct cluster signatures wherein each message in the plurality of messages of the cluster comprises a respective sequence of tokens;

adding the training message to the cluster;

calculating a cluster hash code based on at least one selected from the group consisting of: a same count of tokens in the sequence of tokens of each message in the plurality of messages of the cluster, a same field name of a token in the sequence of tokens of each message in the plurality of messages of the cluster, and a same string value consisting of punctuation for a token in the sequence of tokens of each message in the plurality of messages of the cluster;

selecting the cluster signature based on the cluster hash code;

extracting, based on a data type of the cluster signature, a data value from content of a second message.

17. The one or more non-transitory computer-readable media of claim 16, wherein:

the cluster signature comprises a cluster sequence of tokens that includes a cluster token at a particular position in the cluster sequence of tokens;

a current token occurs at said particular position in the message sequence of tokens;

the data type of the cluster signature comprises the cluster token specifies the data type.

18. The one or more non-transitory computer-readable media of claim 16 wherein selecting the cluster signature comprises detecting that a hash code of the message signature is the same as the cluster hash code.

19. The one or more non-transitory computer-readable media of claim 16 wherein:

each message in the plurality of messages of the cluster comprises a sequence of tokens;

the instructions further cause calculating a cluster hash code based on at least one selected from the group consisting of: a same count of tokens in the sequence of tokens of each message in the plurality of messages of the cluster, a same field name of a token in the sequence of tokens of each message in the plurality of messages of the cluster, and a same string value consisting of punctuation for a token in the sequence of tokens of each message in the plurality of messages of the cluster.

20. The one or more non-transitory computer-readable media of claim 16 wherein said plurality of possible data types comprises a generic type that is compatible with any value.

21. The one or more non-transitory computer-readable media of claim 16 wherein at least one token of the message sequence of tokens comprises at least one selected from the group consisting of: a value and a field name, a hash code of a value, and a hash code of a field name.

22. One or more non-transitory computer-readable media storing instructions that, when executed by one or more processors, cause:

training by:
calculating a message hash code based on a first sequence of tokens that were extracted from a first message, wherein:
said first sequence of tokens comprises at least one fuzzy token that specifies a plurality of possible data types for the fuzzy token, and
the at least one fuzzy token comprises a respective association of a respective probability with each type of the plurality of possible data types;
adding said first message to a cluster of messages that have said message hash code; and
generating, based on said cluster of messages, a cluster signature that describes said cluster of messages;

after said training:
extracting a second sequence of tokens from a second message;
calculating said message hash code based on said second sequence of tokens;
selecting, based on said message hash code, said cluster signature; and
parsing, based on a data type of a token of said cluster signature, said second message.

23. The one or more non-transitory computer-readable media of claim 22 further comprising extracting, from the first message, a field name of at least one token of the first sequence of tokens.

24. The one or more non-transitory computer-readable media of claim 22, wherein:

the instructions further cause generating a message signature based on the first sequence of tokens;

calculating said message hash code is based on the message signature.

25. The one or more non-transitory computer-readable media of claim 22 wherein the first message encodes a hierarchical structure such that at least one token of the first sequence of tokens comprises a value comprising a second sequence of tokens.

* * * * *

UNITED STATES PATENT AND TRADEMARK OFFICE
CERTIFICATE OF CORRECTION

| | | |
|---|---|---|
| PATENT NO. | : 11,372,868 B2 | Page 1 of 1 |
| APPLICATION NO. | : 16/246765 | |
| DATED | : June 28, 2022 | |
| INVENTOR(S) | : Reddekopp et al. | |

It is certified that error appears in the above-identified patent and that said Letters Patent is hereby corrected as shown below:

On the Title Page

On page 2, Column 2, under Other Publications, Line 30, Delete ""Continous" and insert -- "Continuous --, therefor.

In the Specification

In Column 6, Line 63, delete "signatures'sequences" and insert -- signatures' sequences --, therefor.

In Column 23, Line 65, delete "cryptogaphy" and insert -- cryptography --, therefor.

In the Claims

In Column 31, Line 33, in Claim 1, delete "signatures" and insert -- signatures, --, therefor.

In Column 33, Line 18, in Claim 16, delete "signatures" and insert -- signatures, --, therefor.

Signed and Sealed this
Tenth Day of January, 2023

Katherine Kelly Vidal
*Director of the United States Patent and Trademark Office*